C. S. STEVENS.
POWDERED MILK COMPOUND AND PROCESS OF MAKING THE SAME.
APPLICATION FILED AUG. 10 1917.
1,432,635.
Patented Oct. 17, 1922.
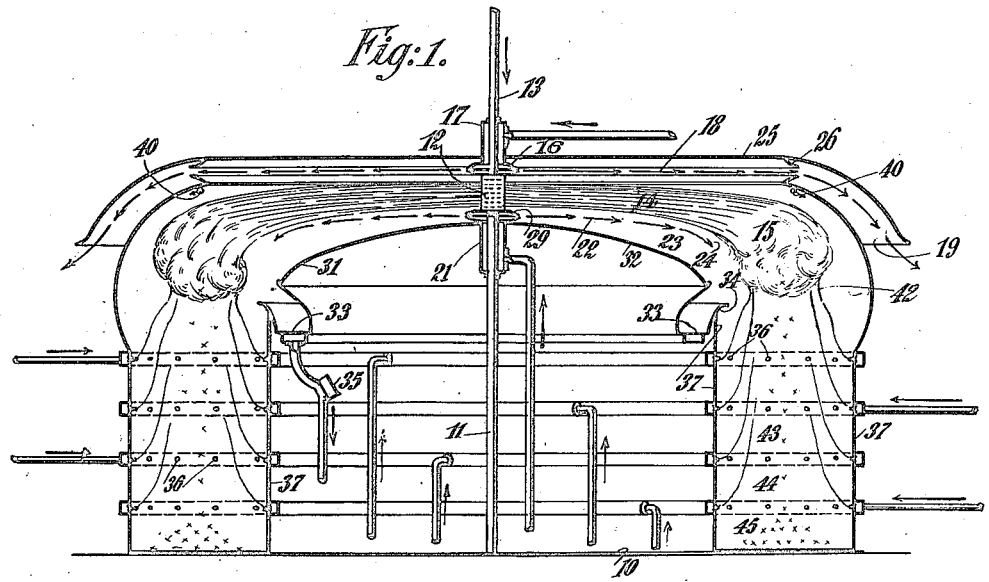
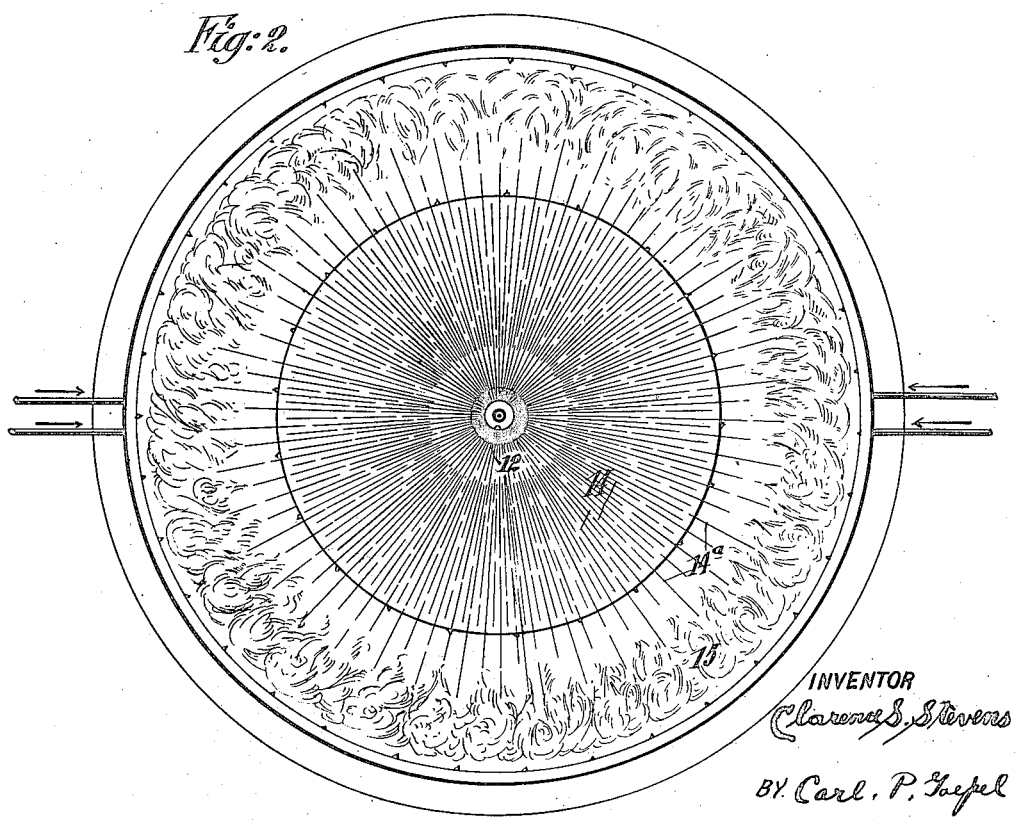
INVENTOR
Clarence S. Stevens
BY Carl P. Goepel
ATTORNEY.

Patented Oct. 17, 1922.

1,432,635

UNITED STATES PATENT OFFICE.

CLARENCE S. STEVENS, OF SHEBOYGAN, WISCONSIN, ASSIGNOR, BY MESNE ASSIGNMENTS, TO CARNATION MILK PRODUCTS COMPANY, OF CHICAGO, ILLINOIS, A CORPORATION OF DELAWARE.

POWDERED-MILK COMPOUND AND PROCESS OF MAKING THE SAME.

Application filed August 10, 1917. Serial No. 185,474.

*To all whom it may concern:*

Be it known that I, CLARENCE S. STEVENS, a citizen of the United States, and resident of Sheboygan, in the county of Sheboygan and State of Wisconsin, have invented a new and useful Powdered-Milk Compound and Process of Making the Same, of which the following is a specification.

This invention relates to powdered milk and processes of making the same, and it has for its object to provide a new and useful milk product in dried and powdered form of a compound of skimmed milk and a substituted alimentary vegetable fat, and has also for its object to provide a new and useful process for making the said product.

Whole cows' milk contains certain percentages of butter fat, and, in order to advantageously utilize this butter fat, it is extracted from the whole cows' milk and used in the making of butter and other products therefrom, this butter fat separation being carried out by any well known mechanical means. The skimmed milk remaining is treated and combined under certain processes with an alimentary vegetable fat, and by means of these processes, an emulsion, incapable of separation, is obtained, which has all the beneficial characteristics of the original milk, and distinct advantages thereover in that the butter fat has been replaced with a readily assimilable substituted fat and the entire product rendered easily digestible, wholesome and nutritious, retaining its stability in all habitable climates.

I have found that this product may, under a certain treatment, be readily reduced to powdered form, so that it may be sold in powdered form and have all the advantages of such powdered condition, but be readily soluble by the addition of water to it, and differ from milk products heretofore made, in being free from lactic acid fermentation and other well known objections thereto.

In view of the treatment that this stable emulsion is subjected to, the powder that is formed, when dissolved in water, has also the same high character of assimilable and nutritious qualities that the compound itself, before being powdered, has been found to have.

It is well known that butter fat in whole cows' milk retains its elliptical globular shape, varying in particles of the smallest size, having a diameter of about 0.0016 millimeter, while the largest particles have a diameter of 0.01 millimeter. Also, when milk is treated, either during condensation or during the powdering of the milk, at high temperatures, exceeding the coagulating point of casein, the high temperatures render the protein insoluble in water, thus rendering a defective product which is not completely soluble in water. Again, very high temperatures bring about the caramelization of milk-sugar, resulting in a burned appearance of the liquid condensate, or in the burned or parched character of the powder. Also, any lactic acid formation renders the casein insoluble in water, especially in those cases where the lactic acid develops to more than one-seventh of one per cent; also it has been found that when fats are heated excessively, they decompose, butter fat, for instance, decomposing at about 242° F. At about such temperatures fatty acids are split up, forming decomposition products some of which are quite injurious, as acrolein.

I find cocoanut oil such as used in the production of the emulsion above referred to, and which in the emulsion is substantially free from free fatty acids, is particularly free from contamination. It is, furthermore, practically immune to changes due to atmospheric conditions. The cocoanut fat is free from fermentable nitrogenous matters, and free from water. It is solid at ordinary temperatures and melts into a limpid and colorless oil, and does not show any impurity. It has a resistance to, and is practically free from, rancidity. Being composed primarily of laurin, myristin, glycerides, it is very easily digested and assimilated. It is equivalent, too, in heat producing value in the human system to about 2.27 lbs. albumins, such as white of eggs, lean meat, and also to about 2.27 lbs. of carbohydrates, such as sugar, starches, etc. It is susceptible to sterilization, a quality not shared to the same extent by animal fats. Its freedom from acids, when refined, enables its use in institutions for treatment of digestive diseases. Its melting point is lower than that of the bodily heat (36° C.), and thus, and especially when it does not contain free fatty acids, is readily digestible. In respect to the production of heat and energy, the said fat is most valuable. If, for instance, it is said in general that one gram of carbohydrates, such as sugar or starch, on complete combustion, will yield 4000 calories, and one gram of protein 5500 calories, then one gram of cocoanut oil or fat will yield 9300 calories. Thus, such cocoanut fats and oils may be classed as the most concentrated and most valuable human foods. Bacteria concerned in the souring of the milk, producing an oily, fishy, or sallowy taste, and making it rancid (*Bacillus fluorescens, liquefaciens,* and by fungi, such as, *Cladosporium butyri, Oidium lactic,* and *Penicillium glaucum*), as also disease producing bacteria and germs (tubercle bacilli) are absent in the product produced under my process, and, if such germs are present, they are very minute in quantity in contrast to the presence of such germs in products containing butter fat.

Furthermore, while butter fat will decompose at about 242° F. and form fatty acids which are quite injurious, cocoanut oil will not tend to decompose until at about 360° F., thus enabling higher temperatures to be used for the evaporation of the water, without fear of decomposing the cocoanut fat, than would be possible when butter fat forms a part of the liquid to be powdered.

Cocoanut oil, when refined, and free from free fatty acids, and subjected to a treatment modifying the formation of free fatty acids, is, when it is combined with skimmed milk concentrate, and when treated in accordance with my process, to be hereinafter described, and also that to be described for the conversion of it into powdered form, is maintained in condition having the advantages pointed out, so that the powdered product resulting will contain such refined cocoanut oil free from free fatty acids, and so treated that the milk constituents and the substituted fat will be in the form of a dried stable emulsion, remaining dry and stable, and at the same time readily soluble in water.

In some methods heretofore proposed for making a dry powder, from a liquid or semi-liquid, the vaporized liquid has been subjected immediately to the hot air blast or current which was intended to evaporate the water in the liquid, the hot air current carrying the vaporized milk in the same direction until the powdered condition was obtained. In consequence of this, the milk was immediately subjected to the hottest portion of the hot air current, and by reason of this, decomposition of the constituents of the milk, due to the excessive heat immediately applied to the liquid, resulted, whereby the powder formed resulted in the excessive formation of lactic acid, and in other instances, resulted in the burned product which was unfit for use. Also, in such well known processes, the hot air current acted upon the sprays or globules, with both traveling in the same direction. Also, in some of the well known processes, the hot air current serves the additional function of carrying the milk upwardly, and so it necessarily follows that the initial blast of hot air must be of high temperature to permit this carrying upward, and as a result of the specific gravity of the formed milk particles, these will have a tendency to act in a direction contrary to the direction of the hot air blast, whereby they become subjected to more heat and to a repetition of heating conditions which are really unnecessary, and by reason thereof bring about a decomposition of the constituents of the milk, whereby the ultimate powder that has been obtained is readily susceptible to lactic acid formation, in some instances, and to parching, in other instances.

In carrying out my process, skimmed milk, from which butter fat has been extracted, is subjected to a pre-heating, so as to make the skimmed milk of uniform temperature throughout. This skimmed milk might be treated to any one of three subsidiary steps, which consist, first, in either adding a vegetable fat in proportionate quantities, from which the free fatty acids have been removed, to the skimmed milk, before any concentration of the skimmed milk takes place, or, secondly, adding such vegetable fat in proportionate quantities to the skimmed milk during its concentration, or, thirdly, adding such vegetable fat to the concentrate in proportionate quantities after the concentration has been completed. In either of these three cases, an association of the vegetable fat and concentrate results. Immediately after the completion of the concentration, the concentrated skimmed milk and the substituted fat are subjected to homogenization at the temperature at which the emulsion leaves the concentrators or condensers. In the use of concentrators or condensers, I prefer to use the vacuum pan. This concentrate of skimmed milk and vegetable fat, as stated, is homogenized, by sending it in successive small portions through homogenizers of any well known type, preferably retaining the vacuum pan temperature, or as close thereto as practical conditions permit, and as a result of this operation, all particles of fat in the emulsion are broken up into very fine particles, substantially uniform in their size or diameters, so that when the emulsion leaves the homogenizers, a substantially uniform and homogeneous emulsion of the skimmed milk concentrate and associated fat is obtained.

In order to dry this product, the product, after it is homogenized, is subjected to the drying process to be now described, forms the subject-matter of this invention. The product itself will be also described and finally claimed.

In carrying out this process, I provide a container of circular shape. In the center portion of this container, and within it is placed an apparatus corresponding closely to one of the homogenizer units of the well known homogenizing machines, but with a smaller number of exit ducts and without the enveloping shell. Then, I place it in vertical position in line with the axis of the circular container. The exterior shell of such a unit having been removed, the jets are thrown out of the ducts between the discs and fly out into the atmosphere instead of being conducted away by the enclosing shell, as is heretofore customary in homogenizing machines. These jets are thrown out under a pressure which is adjusted depending upon the size of the chamber and upon the amount of milk to be powdered, and on other considerations to be pointed out hereinafter. These jets are ejected from the homogenizing unit radially of the center point of the container with considerable force, and at considerable velocity. These jets flow in a direction at right angles to the axis of the container, and are considerable in number, counted in a circular path around the homogenizing unit. In view of the horizontal direction of the flow and the velocity thereof, the extreme ends of these jets, that is, the tip ends, divide themselves into finely divided jets, which, acted upon by gravity and air resistance, are converted into a finely divided atomized condition forming a vaporous laden zone of nebulous-like character without any current flow. This zone is formed at the circumferential portion of the chamber. This vapor-laden nebulous emulsion is discharged into a substantially static drying atmosphere. In the present embodiment of the invention, air is employed as the drying medium, the dry air rising upwardly but having practically no velocity. It, therefore, offers no appreciable resistance to the precipitation of the vaporized emulsion, the slowly rising drying air being diffused throughout the slowly descending nebulous vapor. The dry and warm air evaporates the water in the nebulous vapor, and this evaporated water is directed away from this zone. The water contents of the vapor having been evaporated, the homogenized emulsion in widely separated state is converted into an extremely fine powdered state, and this gradually descends through the very gradually upwardly rising warm and dry air, this air, as stated, having substantially no velocity so that substantially no resistance is offered to the gravitational force acting on the dried emulsion particles.

Having thus been powdered and dried in extremely fine condition, the powdered form is permitted to descend still further through a series of warm and dry air secondary zones, less warm than the primary drying zone, until it passes through the lowest zone which is attenuated to the atmospheric temperature. This attenuation of the temperatures from the drying temperature in the drying zone, to the lowest temperature of the secondary zones, is very gradual and serves to prevent the dry and warm particles from being subjected immediately to the atmospheric temperatures, as is the case with other methods of the prior art.

In order to prevent the dry powder from accumulating upon the inner walls of the container, jets of air are provided and suitably arranged, which will prevent any deposit of the powder on the inner walls of the container.

For this purpose, and for other reasons which will appear, jets of air are arranged above the homogenizing unit, and these jets are also radially arranged and emanate from the center of the container radially outward to the circumferential portion thereof, in substantial parallelism with the emulsion jets. A similar series of jets are arranged below the emulsion jets of the homogenizing unit. Certain other portions of the inner walls of the container are also provided with jets, for the purpose of preventing the deposit of the powder on the inner walls of the container. But the radially arranged jets of air above and below the jets of the emulsion emanating from the homogenizer have special functions and must be specially governed in pressure and velocities and temperatures and dryness, to carry out these functions. One advantageous feature of these air jets is to cause such air, namely, dry air, to intermingle immediately with the vaporous jets, when emanating from the homogenizer. These air jets take up some of the moisture and the drier the air, the better will this function be. The uppermost air jets, namely, those jets which are above the emulsion jets, are warm or heated, and dry, but is cooler than the emulsion, so as not to exert any drying action and cause deposits here, and in order to prevent a deposit of formed powder upon the top wall of the container on the inner side thereof, it has a velocity greater than the jets of the emulsion, so as to carry along any liquid vapor or powder which might otherwise be deposited upon this inner surface of the upper wall. The jets of air below the emulsion jets, on the other hand, are hotter than the upper air jets, and are hotter than the emulsion, but are also dry, and the velocity of these lower air jets is less than the velocity of the emulsion jets. In consequence of this, there will be a tendency of the lower jets to draw downwardly the emulsion jets, and at the same time the dry hot air will intermingle with the emulsion sprays, and subject them to a pre-drying gradual to the primary drying. The resultant actions of the forces will bring about an intermingling of this hotter air with the jets of vaporized emulsion, whereby the air will flow with this vaporized emulsion and the air being warm and dry will commence the action of drying by the heating of the moisture contained in the emulsion jets. Part of the dry warm air of this lowermost air jet has, of course, a tendency to go upwardly though acting under pressure, and at considerable velocity aerating the emulsion. By the intermingling of this warm air with the emulsion jets, the vapor which will form itself into a nebulous cloud at the ends of the jets of the emulsion will be warmed to such a degree as to make it receptive to the drying and powdering primary air zone, which has been before described.

The fact that this warm dry preheating air intermingles with the jets of vaporized emulsion enables temperatures in the primary zone to be used, which will act upon the vaporized emulsion nebulous zone. The action of the various air conditions at conditioned temperatures and dryness being gradual, the constituents of the emulsion are treated gradually until the drying takes place that forms the powder.

To carry out the process, apparatus is used, one form of which is described, which, however, may be varied, depending upon the quantity of milk to be treated, climatic conditions, etc.

The solubility and the digestibility of the peptone remain undiminished, by use of my process, and also the temperatures and actions are such as to make the resultant powder less liable to lactic acid formation than in the processes heretofore proposed. The soluble qualities of the proteins remain undiminished, the qualities of the fat remain undiminished. At all times the emulsion and powder are subjected to gradual changes of temperatures.

To carry off the air containing the evaporated water separately from the powdered form, an outlet is provided in the container which is placed in line with resultant forces of the forces that re-act on each other, whereby the evaporated water carried by the air, or the moisture laden air, will flow out of this outlet. In some cases, a suction device would assist, or may be used to bring about this removal of the moisture laden air. This suction device would of course, have a dust collector of a suitable and approved form, so that in the event any dust or powder particles do flow in this direction, though such flow is unlikely, they will be caught up by this dust collector. The container is also provided at its upper portion with an outlet for the uppermost jets of colder air which serve to prevent the dry powder from depositing upon the uppermost wall of the container, and which assist in the formation of the nebulous zone, these openings being arranged in the nature of ventilators, so as to provide suitable ventilating means.

In the accompanying drawings, Figure 1 is a central section of the apparatus, and Figure 2 is a plan view partly in section on line 2—2 of Figure 1. A base plate 10 is provided with a central standard 11, and at the uppermost portion of this central standard is provided a homogenizer 12 that has its outer shell removed, and with less number of ducts than are present in the usual forms. The homogenizer 12 is fed by an emulsion inlet pipe 13. The jets ejected by the homogenizer in a radial direction are indicated by 14, these breaking up into jets $14^a$ (Figure 2), terminating in a vaporized end 15, which vaporized end is substantially nebulous and forms the zone. Above the homogenizer is a series of air outlets 16, arranged in circular fashion, fed by a supply pipe 17, and these jets, indicated by 18, flow radially of the outlets 16 and flow out of the container at 19, having passed through the circumferential ventilating opening 26 in the upper wall 25. Below the homogenizer 12, a series of air outlets 20 are radially arranged which are fed by a suitable supply pipe 21, and these jets 22 gradually intermingle with the emulsion jets, assisting in forming the nebulous vapor 15, at about 23, 24. Immediately as the dry warm air leaves the outlets 29, though at considerable velocity, parts of it rise and intermingle with the emulsion jets and are drawn along with these. The other portions of these lowermost air jets gradually expend their velocities and then rise to intermingle at different points of the emulsion jets, the longest air jet expending its velocity at a point within that point where the emulsion finally has its velocity expended, slightly beyond 24. When the moving velocity of the emulsion jets have expended their velocities, the sprays meeting the dry warm primary zone become converted into a nebulous condition, due probably to the separation of the finely divided vaporized emulsion particles under the expansion of emulsion vapor in that portion of the container which contains the drying air. Here the diffusion of the emulsion zone and primary air zone takes place, and the moisture is separated from the solids, the solids dropping under the action of gravity downwardly. Below the outlets 20 and jets 22 is arranged the lower wall of the container indicated by 32, which is curved at 31, and in the neighborhood of the portion indicated by 32, is provided an outlet 34, which has a screen or dust collector 33, and a suction fan 35, which acts to suck out of the container the moisture or air saturated with moisture. The outlet 34 is pocket-shaped. Immediately below this moisture extractor, a series of jets are arranged, indicated by 36, and these are arranged in circular fashion around the annular portion of the container, which annular portion is indicated by 37. These jets 36 emit dry and warm air at temperatures which are previously regulated and this warm air gradually diffuses upwardly so as to come in contact with the nebulous portion 15 of the jets. Below the series of jets 36 above which jets the drying zone is formed, which is indicated by 42, another circular series of jets are arranged which are indicated by 43, and this series of jets 43 is followed by a circular series of jets 44, and below this another circular series of jets 45 are arranged. All these series of jets, either 36, 43, 44, 45, are arranged circumferentially of the annular member 37, and have dry and warm air pass therethrough of suitable temperatures properly regulated, these temperatures decreasing so as to form different zones along the height of the annular member 37, from the upper portion of this annular member 37 to the lower portion thereof, the temperature being suitably attenuated so that the powdered particles passing through these various temperatures will not be subjected to any sudden or abrupt change in temperature, but to a gradual drop in temperature from the top to the bottom of the annular member 37, where the temperature is substantially the temperature of the atmosphere, and where the powder will leave the apparatus thoroughly dried and having all the characteristics heretofore pointed out. The jets 36, 43, 44, 45, are adjacent the wall of the annular portion 37 of the container, and being adjacent and emanating at very low velocities, will pass along the wall and prevent a deposit on the same. The air cavity will induce the powder to drop therethrough. There is a wall protecting jet 40 at the upper portion of this annular member 37, which jet or jets are arranged in circular fashion as indicated by 40, directing its flow of forced air, forced in by pumps or the like downwardly, and this jet cleanses the wall so as to prevent any deposit of the powder upon the wall. Air suitably dried and at suitable temperatures is forced in through the jets.

The jets of air 18 of greatest velocity impel the upper portions of the emulsion jets adding slightly to the velocity of these, and the jets of air 22 of less velocity than the emulsion jets detract slightly from the emulsion jet velocity, and thereby the nebulous vapor is formed under different velocity expending. The result is that this nebulous vapor moves very slowly in a circular or curved direction. This movement is very slight. It is augmented slightly by the cleansing jet 40 which acts in consonance with the uppermost portion of the vapor. To assist this further, though such movement must be maintained very slowly, the jets 36 are regulated so that slightly more air pressure results at the outermost jets below the cleansing jets 40. The outermost jets and the cleansing jet, if they meet, produce a result also that tends to augment the vapor zone movement, which as stated is very slight, not a current, but only a gradual movement. In consequence of this, the nebulous zone tends to move in a direction towards the screens 33. This movement is also assisted by the suction fan 35. This slight movement of this nebulous zone meeting the primary drying zone, causes the powder when formed to drop during this movement, and the moisture laden air to move towards the pocket having the screens 33 where the moisture laden air is sucked out. This pocket is made capacious, so that here a zone of air forms, rather than a means to form a current of air, the pocket depending downwardly, to hold the heavier moist air.

It will be understood that there is no mechanically induced current flow of the nebulous zone of emulsion 15. The suction fans 35 are only powerful enough to draw the moisture laden air surrounding this zone into the outlet pocket 34, and there is no positive direct suction effect from the fans upon the nebulous zone, although the latter has a slight tendency to follow the direction of movement of the moisture laden air.

The entire atmosphere in the container at the drying zone is permeated with warm dry air, so regulated that the moisture laden air cannot go anywhere excepting at that portion not under this condition, and this portion is at the pockets. Thus, the moisture laden air has no affinity to any portion excepting to the pockets.

The method described is one form of my process, and, of course, it may be varied to some extent, depending upon the mechanism used, but it will be seen that a very efficient powdered state of the emulsion is obtained, which results in a dried emulsion of emulsified and homogenized skimmed milk concentrate and a vegetable fat associated therewith of stable and permanent qualities, incapable of separation, the dried powder resulting therefrom having all the advantages heretofore pointed out. The dry powder is more soluble in water than in its normal state, and no less peptogenic.

In some cases, as when cottonseed oil is used, it is preferable to subject it to a hydrogenation immediately prior to homogenization, whereby the hydrogen and the fatty acids are brought into contact in the presence of a suitable catalyst, whereby the re-action converts the soft fats and oil of small value into edible hard fats of greater value.

I have described the various phases of my invention to enable those skilled in the art to understand the same, and it is clear that in the specific process described as the embodiment of my invention, changes may be made without departing from the spirit of my invention as defined in the appended claims. The product itself is characterized by the description made thereof and by the appended claims.

Having thus described my invention, I claim as new, and desire to secure by Letters Patent:

I claim:

1. In the process of producing a powdered milk food product having particles of ultra-minute size the step which consists in dehydrating the nebulous vapor of an initially stable emulsion of skimmed milk and a vegetable oil in a substantially static drying atmosphere.

2. The process herein described, which consists in ejecting a homogenized concentrate of skimmed milk and vegetable fat from which the free fatty acids have been removed in a radially horizontal direction into a nebulous vapor, subjecting the nebulous vapor of the homogenized emulsion to a diffusing drying air, and converting the vaporized emulsion into powdered state.

3. The process herein described which consists in ejecting a homogenized emulsion of a concentrate of skimmed milk and vegetable fat to form it into a nebulous vapor, subjecting the upper portion of the jets and nebulous vapor to a current of air of a temperature less than the temperature of the emulsion jets and traveling in the same direction therewith, and at a velocity greater than the velocity of the emulsion jets, and simultaneously subjecting the lower portion of the emulsion jets to a current of air traveling in the same direction therewith, having a velocity less than that of the emulsion jets and having a temperature higher than the emulsion jets, and diffusing with the nebulous vapor a drying air for converting the nebulous vapor into powdered state, free from fatty acids, and lactic acid fermentation.

4. The process herein described which consists in ejecting a homogenized emulsion of a concentrate of skimmed milk and vegetable fat to form it into a nebulous vapor, subjecting the upper portion of the jets and nebulous vapor to a current of temperature less than the temperature of the jets of emulsion, and traveling in the same direction therewith, and at a velocity greater than the velocity of the jets of emulsion, and simultaneously subjecting the lower portion of the emulsion jets to a current of air traveling in the same direction therewith, having a velocity less than that of the emulsion jets and having a temperature higher than the emulsion jets, and diffusing with the nebulous vapor a drying air for converting the nebulous vapor into powdered state, free from fatty acids, ejecting the current of air from the nebulous vapor, and ejecting the condensed moisture-laden air away from the nebulous vapor and the drying air, and the dry powder.

5. The process of changing a product from liquid to powdered form which consists in discharging the liquid in the form of a nebulous vapor into a substantially static drying atmosphere.

6. The process of changing a product from liquid to powdered form, which consists in discharging the liquid in the form of a nebulous vapor into a drying medium offering no resistance to the precipitation of the powder particles.

7. The process of changing a product from liquid to powdered form which consists in discharging the liquid in the form of a nebulous vapor into a drying medium offering no resistance to the precipitation of the powder particles, and progressively decreasing the temperature of the drying medium to that of the atmosphere during the precipitation of the powder particles.

8. An improved process which consists in ejecting an homogenized concentrate of skim milk and an edible vegetable fat into a nebulous vapor, and subjecting the nebulous vapor to a diffusing drying air for converting the nebulous vapor into powdered state.

9. That step in the art, which consists in converting a liquid into a powder by converting the liquid into a nebulous vapor by diffusing with dried air, without mechanically induced current flow.

10. That step in the art, which consists in passing a powdered and dried residue of a liquid through warm and dried air zones of gradually decreasing temperatures, the lowest zone and that of temperature being attenuated to the atmosphere.

11. That step in the art which consists in diffusing a nebulous vapor of a liquid with dry air, and then immediately passing the resulting product through warm and dry air zones of gradually decreasing temperatures.

12. That step in the art which consists in homogenizing a liquid containing fat free from free fatty acids in the presence of a drying air for converting the homogenized liquid and fat into a powdered state.

13. That step in the art which consists in homogenizing a liquid containing fat free from free fatty acids in the presence of a drying air for converting the liquid and homogenized fat into a powdered product free from free fatty acids and free from lactic acid fermentation.

In testimony, that I claim the foregoing as my invention, I have signed my name in presence of two subscribing witnesses.

CLARENCE S. STEVENS.

Witnesses:
AGNES Y. COUGAN,
MOE M. WEINBERG.